Dec. 26, 1967   D. M. TRAMMELL   3,360,292
GRAPPLE
Filed Sept. 6, 1966
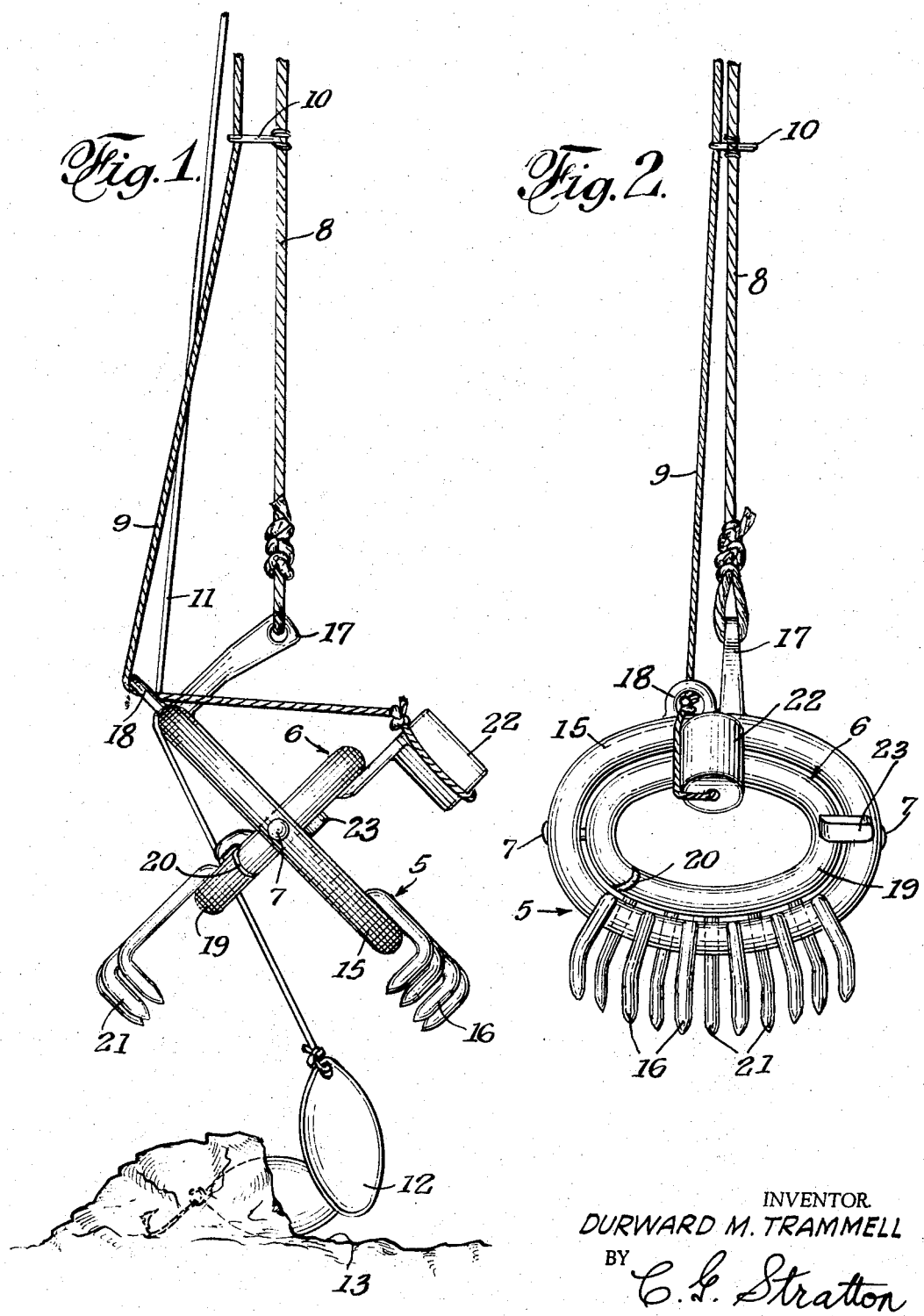
INVENTOR.
DURWARD M. TRAMMELL
BY C. L. Stratton
ATTORNEY 3,360,292
GRAPPLE
Durward M. Trammell, 5009 Genevieve St.,
San Bernardino, Calif. 92407
Filed Sept. 6, 1966, Ser. No. 577,359
4 Claims. (Cl. 294—66)

ABSTRACT OF THE DISCLOSURE

The invention deals with a grapple which is adapted for various retrieving uses, but is particularly designed for retrieving hooks, lures and similar tackle, which may become snagged on the bottom. The device is characterized by its simplicity of construction and operation, it comprising but two hingedly connected grapple elements, one within the other, and which are weighted to retain an open position while descending on the end of a cord toward the item to be retrieved, and which are adapted to close over such item by manipulation of a second cord, both cords being controlled by the angler. The grapple is guided to the item to be retrieved by the fish line to which it is attached and may be received within the inner grappling element by lateral introduction threaded through a labyrinthine opening in the smaller of said elements. When closed over the item being retrieved the grappling elements may be retained closed by holding the two cords against relative movement while the grapple is being raised.

Background of the invention

The invention is characterized by simplicity of both construction and operation, it being an object of the invention to provide a grapple thus characterized and, further, due to its simplicity, provide means affording a nonsnarling operation. In other words, the two-cord control, independent of the fish which serves only to guide the grapple to the item to be retrieved, enables a foolproof operation which solves the more-difficult-to-control devices of the prior art, particularly those depending on grapples that must be raised and grip the fish line in their operation. The present device is deemed to minimize cutting of the fish line or the same becoming so snagged that loss of the device to be retrived results.

This invention also has for its objects to provide such means that are positive in operation, convenient in use, easily installed in a working position and easily dsconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view of a grapple according to the invention and shown in open condition preparatory to closing over an item to be retrieved.

FIG. 2 is a front elevational view thereof.

The grapple that is illustrated comprises, generally, an outer grapple element 5, an inner grapple element 6, and a pivot 7 connecting said elements so the same may move thereon relative to each other between open and item-enclosing positions. A cord 8 suspends the grapple and is connected to the outer element 5, and an actuator cord 9 is connected to the inner element 6 and so inter-engaged with the element 5 as to cause the element 6 to turn on the pivot 7 as the actuator cord 9 is manipulated longitudinally relative to the cord 8. One or more eyes or loops 10 may be provided on one cord to guide the other cord in said longitudinal movement relative to the other cord. FIG. 1 shows a fish line 11 on the end of which means 12, such as fishing tackle, lures, hooks, etc. are attached. Said figure shows such tackle caught or snagged on the bottom 13 and represents an item or items to be retrieved by the grapple.

The outer grapple element 5 is shown as a solid ring 15, preferably of metal and of round cross-section. A set of laterally bent hooks 16 extend radially outward from said ring, and an arm 17 extends from the diametrically opposite side of said ring and in a direction opposite to the direction that hooks 16 are bent. The cord 8 is connected to the end of said arm 17, the element 5, therefore, hanging from said cord at an angle to the vertical and with the bent ends of the hooks 16 directed angularly downwardly. The angle assumed by the ring 15 will depend on the length of arm 17 and the ratio of the weight of said arm and an eye 18, adjacent said arm, and that of the hooks 16 at the diametrically opposite part of said ring. In any case, the element 5 is so formed that its upper portion assumes a position on one side of the pivot 7 and the lower portion, a position on the opposite side.

The inner grapple element 6 also comprises a ring 19, preferably of metal and of a size to loosely fit within the ring 15. The ring 19 is round-sectioned and is provided with a cord-threading passage 20 that is so formed that the fish line 11, while connected to its tackle means 12, at one end, and to a fishing reel (not shown), at the other, may be laterally passed through said passage 20 so as to extend through said inner grapple element. A complement of laterally bent hooks 21 extend from said ring 19 and are spaced so as to interfit, alternately with the hooks 16 of the grapple element 5 when the two rings 15 and 19 are moved into a coplanar position on the pivot 7. The hooks 21 are bent or directed toward the hooks 16 which are directed toward the hooks 21. Diametrically opposite to said hooks, a counterweight 22 is provided on the ring 19, the same overbalancing the element 6 to an angular relative position with the element 5. A stop lug 23 on a ring 19 engages the ring 15 to limit the latter position of the elements. The hooks 16 and 21 are in spaced, item-engaging position, as in FIG. 1. The cord 9 is preferably connected to the weight 22, is passed through the eye 18 and then through the loop or loops 10 in generally coextensive relation with the cord 8.

It will be clear that, after the fish line 11 has been passed through the passage 20 into the ring 19, the grapple may be lowered in its open condition and guided by the line 11 to the snagged tackle 12. When the grapple encounters the bottom 13 or said tackle, the cords 8 and 9 will become slack, advising that the granpple is in retrieving position. Now, the cord 9 is pulled upwardly relative to the cord 8, causing the inner element 6 to turn on the pivot 7 and closing of the hooks 16 and 21 over the tackle 12. Now, both cords 8 and 9, as well as the line 11, may be taken in to raise the grapple and the tackle held thereby to the surface.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A grapple comprising:
(a) an outer ring element provided with grapple hooks suspended from a cord and formed to hang from said cord at an angle to the vertical with the diametrically opposite portions of the ring on opposite sides of said cord,
(b) an inner ring element with grapple hooks and pivotally connected to and loosely fitting in the outer ring and weighted to assume an angle intersecting the angle of the outer ring,
(c) the hooks of the rings extending from the lower portions of the rings and bent to be directed toward each other, the hooks of one ring being spaced offset from and inter-fitting with the hooks of the other ring, and
(d) a second cord connected to the weighted portion of the inner ring, passing through an eye in the outer ring, and extending in general parallelism to the first cord, the inner ring element, upon upward pull on the second cord relative to the first cord, swinging the latter ring on its pivot to pivot the rings in directions to bring the hooks thereof into grappling inter-engagement.

2. A grapple according to claim 1 in which the inner ring is provided with a passage through which a fish line is adapted to be laterally passed to extend vertically through the inner ring.

3. A grapple according to claim 1 provided with a stop inter-engaging the rings to limit their intersecting relationship.

4. A grapple according to claim 1 in which the mentioned eye in the outer ring extends from the upper portion thereof with the second cord extending generally horizontally from the weighted portion of the inner ring, through said eye and upwardly alongside the first cord, a guide loop on one of said cords to guide the other during closing manipulation of the grapple.

References Cited

UNITED STATES PATENTS 3,243,911    4/1966    Splawinski _____ 43—17.2

EVON C. BLUNK, *Primary Examiner.*

R. D. GUIOD, *Assistant Examiner.*